United States Patent
Gremmert et al.

(10) Patent No.: US 6,828,922 B1
(45) Date of Patent: *Dec. 7, 2004

(54) SYNTHETIC AIRBORNE HAZARD DISPLAY

(75) Inventors: Scott Gremmert, Redmond, WA (US); Kevin J Conner, Kent, WA (US); C. Don Bateman, Bellevue, WA (US); John Hruby, Monroe, WA (US)

(73) Assignee: Honeywell International Inc., Morristown, NJ (US)

( * ) Notice: Subject to any disclaimer, the term of this patent is extended or adjusted under 35 U.S.C. 154(b) by 65 days.

This patent is subject to a terminal disclaimer.

(21) Appl. No.: 09/721,294

(22) Filed: Nov. 22, 2000

Related U.S. Application Data (63) Continuation-in-part of application No. 09/461,712, filed on Dec. 13, 1999, now abandoned, which is a continuation of application No. 09/248,367, filed on Feb. 8, 1999, now Pat. No. 6,043,756.
(60) Provisional application No. 60/118,223, filed on Feb. 1, 1999, and provisional application No. 60/074,067, filed on Feb. 9, 1998.

(51) Int. Cl.$^7$ .................................................. G08G 5/00
(52) U.S. Cl. ...................... 340/949; 340/968; 342/26 B; 701/14; 702/3
(58) Field of Search ................................. 340/949, 963, 340/968, 945; 701/9, 10, 14; 73/178 R; 342/26, 26 R, 26 B, 26 D; 702/3

(56) References Cited

U.S. PATENT DOCUMENTS

| | | | | |
|---|---|---|---|---|
| 4,996,473 A | * | 2/1991 | Markson et al. | 342/72 |
| 5,265,024 A | * | 11/1993 | Crabill et al. | 342/26 |
| 5,363,107 A | * | 11/1994 | Gertz et al. | 342/26 |
| 5,657,009 A | * | 8/1997 | Gordon | 340/968 |
| 5,757,322 A | * | 5/1998 | Ray et al. | 342/26 |
| 6,014,606 A | * | 1/2000 | Tu | 701/200 |
| 6,043,756 A | * | 3/2000 | Bateman et al. | 340/945 |
| 6,184,816 B1 | * | 2/2001 | Zheng et al. | 342/26 |
| 6,188,960 B1 | * | 2/2001 | Baron et al. | 702/3 |
| 6,199,008 B1 | * | 3/2001 | Aratow et al. | 701/14 |
| 6,381,538 B1 | * | 4/2002 | Robinson et al. | 701/211 |
| 6,441,773 B1 | * | 8/2002 | Kelly et al. | 342/26 |

* cited by examiner

*Primary Examiner*—Brent A. Swarthout
(74) *Attorney, Agent, or Firm*—Black Lowe & Graham PLLC (57) ABSTRACT

A system and method for downlinking weather data, generated by existing weather and data sensors, to a ground station. The ground station utilizes data from multiple aircraft to form refined weather information, and uplinks the refined weather information to the aircraft. The refined weather information is stored at the aircraft and picture generating equipment, such as an existing onboard ground proximity terrain or weather radar picture and symbol generator, generates pictorial information depicting weather. The pictorial information is displayed, for example by an existing EFIS or weather radar display, in the form of polygons.

13 Claims, 10 Drawing Sheets

SYNTHETIC AIRBORNE HAZARD DISPLAY

PRIORITY APPLICATION

This application is a continuation-in-part of Ser. No. 09/461,712 filed Dec. 13, 1999, now abandoned, entitled "Synthetic Airborne Hazard Display" which in turn claims priority from Ser. No. 60/118,223 filed Feb. 1, 1999, and which is a continuation from Ser. No. 09/248,367 filed Feb. 8, 1999, now U.S. Pat. No. 6,043,756, entitled "Aircraft Weather Information System" which is a continuation of Ser. No. 60/074,067 filed Feb. 9, 1998.

BACKGROUND OF THE INVENTION

The invention relates to delivery of weather product information to the cockpit of an aircraft and in particular to providing weather data on an aircraft cockpit display.

Commercial aircraft operating in United States air space have on-board weather radar systems. Existing on-board weather radar systems provide data to the crew on weather near the aircraft, for example, weather ahead of the aircraft within the range of the weather radar unit. The weather information is displayed on a cockpit weather display. However, the weather data collected by an aircraft is available only to the particular aircraft experiencing the weather. The data is not transferable to the ground or to other aircraft. Thus, today, weather information displayed on on-board cockpit displays is limited to the weather returns supplied by the on-board weather radar.

Visual depictions and bounding of significant hazardous weather areas outside the range of an on-board weather radar system on a cockpit display would be a significant operational tool for the aircraft crew.

SUMMARY OF THE INVENTION

This system is for displaying graphically to a flight crew the atmospheric conditions and potential threats at any location on the planet, regardless of their aircraft's current position and direction. This invention is a variation of an idea that has been tried unsuccessfully by others in the past. The basic idea is to portray atmospheric conditions (generally, severe weather) to a flight crew. The display tries to show conditions from a point of view other than what the pilot can see out the window and to show them long before the aircraft encounters them. The purpose is to give the crew sufficient information early enough to be able to make informed decisions about minimizing encounters with severe weather.

The system is interactive and tailored, not just a general broadcast. The system can be fitted to commercial aircraft cockpits with minimal time and expense. The system can work effectively using just the communications bandwidth currently available. The system is not just a passive indicator, it actively monitors for threats and alerts the crew when potential threats are detected. This system turns the hundreds of commercial aircraft aloft into remote sensors for a real-time world-wide weather measurement system. Because information is collected from multiple platforms, the present invention provides a method of converting all data to a common reference system, and provides a method to quantify and track errors caused by position error or spurious data. Also, because the transmission of raw weather data consumes large amounts of bandwidth, the invention describes various methods of data selection and compression of downlinked and uplinked weather information.

The synthetic weather display invention is a natural extension of the synthetic terrain display ability described in U.S. Pat. No. 5,839,080, "Terrain Awareness System". There are three keys to making this idea into practical reality. First, the system must work with the existing world-wide aircraft communications network and be tolerant of the poor performance of that network. A truly effective design takes full advantage of the broad array of communication paths available to get cost-effective world-wide coverage. Second, the data to be portrayed must be radically compressed and encoded. Uplinking massive bit images is not cost-effective today. Third, to get maximum benefit the display algorithm must be intelligent and flexible. It needs not only to provide information to the pilot on demand, but also to constantly monitor conditions in the background and bring potential threats to the pilot's attention. Maximizing the benefits to the crew increases subscribership, which increases the amount of raw data coming into the system, which increases its utility. Increased use also lowers the share of overhead cost for each user.

The present invention resolves significant problems of the prior art by providing an aircraft weather information system wherein weather information is provided to the aircraft from various sources external to the aircraft in a timely and cost-effective manner.

According to one aspect of the invention, data generated by existing on-board sensors is downlinked to a central ground station. Similarly, existing picture generating and display equipment to used to process and display uplinked data. Accordingly, the invention can be utilized without extensive modification to standard equipment already installed on the aircraft.

According to one aspect of the invention, weather data assembled on the ground is up-linked to an aircraft for display on a cockpit display device, for example, a weather radar display or an electronic flight information system (EFIS) display. According to another aspect of the invention, local atmospheric data collected by aircraft weather radar systems and other aircraft sensors, including actual aircraft accelerations and other flight data; altitude; and position are down-linked to a ground station. The down-linked data are assembled with other weather information and an up-to-date atmospheric model is developed. Weather products based on the up-to-date atmospheric model are up-linked to aircraft and displayed in the cockpit. According to yet another aspect of the invention, the up-linked weather products are displayed upon command, depicted as bounded polygons on the cockpit display. The graphic weather displays are configured such that the dynamic behavior of weather phenomena, such as growth, movement, and decay of weather, is readily apparent to the crew.

Another aspect of the invention is interactive features that reduce the crew workload in weather monitoring, The system can be configured by crew or ground operations to automatically alert the crew to selected weather threats, such as turbulent conditions or thunderstorm activity. In addition, the system is configurable such that tailored weather information can be transmitted based on aircraft position or flight plan. Destination weather can be up-loaded for crew viewing as well. Such features allow weather information to be integrated into real-time flight planning decisions.

Other advantages and features of the invention will be apparent in view of the following detailed description and appended drawings.

DETAILED DESCRIPTION OF PREFERRED EMBODIMENT

High Level Description

A system for displaying graphically to a flight crew the atmospheric conditions and potential threats at any location on the planet, regardless of their aircraft's current position and direction is provided. The following are system features:

Some information that is currently conveyed to the crew as text (AIRMET, SIGMET) can now be shown graphically as well, aiding spatial comprehension.

Important information that is currently unavailable to the crew can now be made available (current ground and satellite radar images from hundreds or thousands of miles away).

The system is interactive and tailored, not just a general broadcast.

The system can be fitted to existing commercial aircraft cockpits with very minimal time and expense.

The system effectively uses the communications bandwidth currently available.

The system actively monitors for threats and alerts the crew when potential threats are detected.

This system turns the hundreds of commercial aircraft aloft into remote sensors for a real-time world-wide weather measurement system.

The system can be made predictive, not just indicative of current conditions.

The system works by collecting at one or more central ground stations, all available relevant atmospheric data, including (but not limited to):

Convective activity (from Doppler radar measurements)

Turbulence (from Doppler radar measurement/ downlinked acceleration data)

Favorable or unfavorable winds aloft (from downlinked data from other aircraft)

High surface winds (from local measurements)

Icing conditions (from downlinked data and/or IR measurements)

Precipitation density (from ground and airborne radar reflectivity data)

Lightning (from Storm Scope or other sensor)

Cloud density (from satellite imagery)

Volcanic Ash (from satellite imagery)

As can be seen from the list above, knowledge of many of the threat elements can be improved by having subscribing aircraft report their local measurements (precipitation density, turbulence, temperature, winds aloft, lightning) back to the ground station for collation and rebroadcast. This is an automated extension of the pilot reports (PIREPs) commonly given now by voice, but on a larger scale, more often, and with more detail. Measurements from each subscriber would be used to enhance the safety of all those behind him. The costs associated with collecting these measurements will be minimized through the use of intelligent software, and will be paid by the service provider.

All the collected data will be analyzed, significant features or levels extracted and categorized, and the results assembled into a single coherent model of current atmospheric conditions. Rate data is also collected, and short-term predictions created for changes in strength and position of conditions. Condition data is stored for retrieval and transmission on demand by the Data Center.

Condition data is transmitted to clients in a variety ways. The first method is a general broadcast for the local area. Data included in such a broadcast could cover 300–500 miles from the airport, while broadcast range for such data would likely be about 200 miles from the report transmission source. The broadcast would convey terminal conditions for departing and arriving aircraft in the most cost-effective manner. Such broadcasts would be made every 15 minutes or so. The broadcast data may also be encrypted to ensure that subscribers keep their accounts up to date. Unfortunately, broadcasting data may require an upgrade to the communications network or at least the on-board receivers.

The second method is point-to-point transmission. This allows subscribers to request display of general or specific conditions for wherever they may be headed, to allow them to plan alternates or make deviations long before they actually encounter severe weather.

A third method is unsolicited uplink. Since the Data Center already has knowledge of the subscriber's flight plan, it may send notice of winds aloft, severe weather, etc., along the intended route at the same time departure clearance is issued. These could be brought to the pilot's attention immediately, if threatening, or stored for retrieval enroute. This method is particularly cost-effective if combined with GateLink or a similar communication method.

One of the key advantages of this system is low installation cost. It works with existing hardware, needing only a software change and two additional wires in its most rudimentary form. Most target aircraft already contain the necessary communications gear, either in the form of an ACARS or AFIS. By the year 2003, they will all contain an Enhanced Ground Proximity Warning Computer (EGPWC), which will serve as the symbol generator, and in most cases the EGPWC is already wired to a suitable display. The EGPWC can also serve as the Data Concentrator and Report Generator. In many cases it is already wired to the desired acceleration and air data sources, if available. Also weather radar data can be brought into the EGPWC for analysis and downlink.

The various threat conditions are communicated to the pilot by drawing patterned polygons in place of the weather radar/terrain awareness display. Thus the pilot sees a series of two-dimensional figures in a plan view. In a modern glass cockpit this display is overlaid by NAV symbology on the Electronic Flight Instrument System (EFIS). The threat display is scaled and rotated just as the weather radar and terrain awareness are, so the pilot can easily see the relationship of his short-term path to the meteorological threats around him.

In one embodiment, the uplinked weather threats are a display mode mutually exclusive with airborne weather radar and terrain awareness. In another embodiment, the display modes will be merged. In an air transport environment one pilot will be monitoring the terrain display while the other monitors one of the weather displays.

Low Level Description

One aspect of the invention is the integration of information from multiple sensor viewpoints. This allows crews to see beyond the horizon and through the most intense storm cells, as viewed by other sensor platforms in the immediate area. This process starts with a sensor platform transmitting local weather data, in a native form, to one or more central ground stations. Typical native forms include .BMP and .JPEG computer file formats, as well as various proprietary text and binary formats. Computer software at the ground station processes each different native format separately, extracting the key elements of the data and storing them in a common format. The stored weather elements have the following characteristics:

Compact binary form

Indexed by type, time, location, source, and severity

Linked to original source file (which is archived for at least 72 hours)

A basic system is not likely to require a high degree of indexing and cross-reference, but will be highly desirable for use in an embodiment of the invention which implements interactive features. Also, the archiving of and linkage to original source data is desirable for process auditing and for history retrieval in case of an incident or accident investigation.

After key features are extracted and distilled to a common format, all of the same-type data must be merged into the proper geographic region. The merge process performs several key data conversion steps:

Spatial registration

Elimination of duplicates

Weeding of spurious data entries (voting)

The first step is spatial registration. During the extraction process, all data is converted to uniform global coordinates (WGS-84 latitude/longitude, MSL altitude, UTC time). This conversion involves a number of uncertainties that must be tracked. For example, if the weather radar return of a storm is transmitted by an aircraft, there is uncertainty in the aircraft's own position report (due to inertial reference system drift, for example) and in the actual distance represented by each radar range bin, due to various hardware factors. If a second aircraft paints the same storm from a different direction and transmits that data, the ground station will receive two different pictures of the same storm at two different positions. If these pictures can be compared to a geo-referenced picture (such as NexRad), then the errors can be estimated and subtracted out. Even if no geo-referenced picture is available, if enough independent measurements of the storm are received, the true location can be narrowed by averaging or voting algorithms. Once enough data has been merged into a reliable description of the storm cell (for example), then as new reports are received, the data can be compared to the reference model and their various errors can be further characterized.

After the weather data is spatially referenced, spurious reports and duplicate reports are identified and eliminated. Once a reference model of the local weather is developed, each additional downlinked report of the weather phenomena will have its errors characterized. If the errors are within an estimated error budget, the errors will be subtracted, and the result will be used to update the reference model. This process may be used to merge multiple reports of the same phenomena into a single entity and simultaneously eliminate duplicates. If the estimated error exceeds the estimated error budget, the report must be categorized as either the first report of a new phenomena (e.g. a new storm cell), or it must be categorized as a spurious/erroneous report, and discarded. Detecting and discarding reports that contain errors is an important element in maintaining system integrity. Any system that lacks this feature will not be very functional in the real world.

Rate data is also collected at each sensor platform, such that short-term predictions of weather strength and position can be estimated by the invention. For example, the rate of change in intensity is estimated by taking the average difference of intensity levels for the same part of the storm (after adjusting for positional changes) over time. The prediction is that a storm will continue at the same rate of development (positive or negative) over the next few minutes. The rate is continually updated by new measurements. Examples of other rates that can be estimated are the speed and direction of movement, the change in size, decrease in visibility, increase in rain rate, intensity of a hail storm, and turbulence level.

Because current aircraft communication bandwidth is limited and expensive, the invention conveys both current-state data and also applicable rate values, such that an computer on board the receiving platform can estimate the storm's current character even though the last update is a few minutes old.

In another embodiment of the invention, data compression techniques are employed to reduce the weather report broadcast load. Types of data compression that can be implemented within the present invention comprise at least the following:

Feature Extraction

Data Merge

Coasting

Bit-encoding

Broadcast

The present invention uses pattern recognition techniques to extract the salient features of a picture (NexRad image of a squall line or satellite image of a hurricane or volcanic eruption, for example), coupled with the idea that the flight crew does not need to see all the details or image pixels to determine a safe flight path. A computer can identify and extract key weather features and create a graphic depiction of the features. The graphic depiction gives the crew timely information without requiring the knowledge of all the rules for interpreting a live weather image, and in a form that instantly displays weather trend information. The graphic depiction reduces crew workload while requiring much less bandwidth to transmit, often by a factor of 100 or more. The system is thus more economical to operate.

The invention uses data merge techniques to identify and eliminate redundant, unnecessary weather information at the transmitting station. By eliminating redundant data, the cost of transmission is reduced by a factor related to the number of duplicate sensors.

The invention also uses coasting techniques, which utilize the principle that natural phenomena have inertia, and that over the time periods envisioned (5 to 30 minutes), the rate of change in the measured weather parameter is relatively constant. Some phenomena, such as windshear, can develop and dissipate in less time than those envisioned, thus necessitating the continued use of current on-board sensors. From a strategic planning standpoint, however, coasting is a valid and valuable tool for reducing the required frequency of data updates. Lowering the required data update frequency directly lowers the cost.

In another embodiment of the invention, native source images may be transmitted to the aircraft in those instances where the flight crew requires raw weather information instead of processed weather images. In this embodiment, the native source images can be compressed for transmission efficiency, and then decompressed at the receiving platform. Two compression/decompression formats useful in this embodiment are MPEG-2 and MPEG4.

In yet another embodiment of the invention, the weather reporting broadcast can be configured in a variety of ways in order to maximize the efficient use of a relatively limited aircraft communication network bandwidth. Weather condition data can be transmitted to clients in at least the following ways:

A general broadcast, conveying local conditions, can be transmitted on a pre-arranged schedule of, for example, every 15 minutes, transmitting weather conditions to a radius of about 100–200 miles from the source. VHF traffic congestion at terminals makes point-to-point communication difficult and necessarily very short. Since all aircraft in the area likely want the same information, an automated broadcast compresses demand on the communication channels.

A point-to-point subscriber system would allow an aircrew to request and obtain weather information as desired, allowing the aircrew to plan alternates or make flight plan deviations long before they actually encounter severe weather.

If the weather data source has beforehand knowledge of an aircraft flight plan, the weather information can be broadcast as an unsolicited uplink. The system could be configured to send information along the intended route at the same time departure clearance is issued. Information of hazardous weather could be brought to the pilot's attention at that time, or could otherwise be stored for retrieval enroute.

Any of the above broadcast methods could be sent in the clear as a public service, or encrypted for use only to paid-up subscribers.

The following provides details of the data content, format, and transfer protocol used to communicate weather data to the EGPWC display, such as that described in the Aviation Weather Information Network (AWIN) program. Also described is the content of the data packets passed to the EGPWC at a bit level, the client/server architecture, process timing, and the rendering of the data.

Knowledge of many of the threat elements can be improved by having subscribing aircraft report their local measurements (precipitation density, turbulence, temperature, winds aloft, lightning) back to the ground station for collation and rebroadcast.

In one embodiment the system includes both a long-range ("strategic") display and a short-range ("tactical") display. The strategic display has relatively low spatial resolution, but can show an entire flight plan, even all the way around the planet. The tactical display has relatively high spatial resolution (on the order of 1 nautical mile or less), but a more limited range (up to 320 nm).

The various threat conditions are communicated to the pilot by drawing patterned polygons in place of the weather radar/terrain awareness display. Thus the pilot sees a series of two-dimensional figures in a plan view. In a modern glass cockpit this display is overlaid by NAV symbology on the EFIS. The threat display is scaled and rotated just as the weather radar and terrain awareness are, so the pilot can easily see the relationship of the aircraft's short-term path to the meteorological threats around him.

The uplinked weather threats are a display mode mutually exclusive with airborne weather radar and terrain awareness. In an air transport environment one pilot can monitor the terrain display while the other monitors one of the weather displays.

Received Data Elements

Since the AWIN display makes use of the Airborne Communications Addressing and Reporting System (ACARS), Automatic Flight Information System (AFIS), GateLink, and similar charge-per-use communication channels, it is essential for success that the uplinked data volume be minimized. This section describes how the needed information is entered into the smallest possible packets.

Weather Data Package Using AWINS format

All AWIN data uplinks follow a general format that will be put in place to allow interoperability between first-generation equipment and evolutionary upgrades. In one embodiment, the data going to the airborne computer will be a general broadcast. In another embodiment, custom-tailored messages are requested from a dispatch center by a specific aircraft. All the polygons for a geographical region are packed into a single message that ranges from 2 to 3300 bytes that are broadcast as a file every 15 minutes. The airborne unit picks through this file looking for the things it wants to display. Older airborne software will skip over fields that it does not know how to interpret by using an object type ID and a length field.

| BYTE | LINEAR BITS | DEFINITION | NOTES |
|---|---|---|---|
| 1 | 8:1 | Control ID | See table 0 |
| 2 ... | | Length | See description below |
| ... N | | Package data | |

TABLE 0

| Control ID | Package Data |
|---|---|
| 1 | Weather Volume Package |
| 2 | Surface Conditions Package |

Length Encoding

The length field is the length of the entire package in bytes. If the byte is less than or equal to 127, then this is the least significant 7 bits of the length. If the length is greater than 127, the least significant 7 bits are retained as the most significant part of the length and an additional byte is read.

Algorithmically, reading the length is as follows:

Clear Accumulator

While (Length byte>127)

{Shift least significant 7 bits of length onto accumulator.

A=(A<<7)|(LEN&0x7F);

Read next length byte}

Use least significant 7 bits as least significant 7 bits of accumulator.

Accumulator contains length of message in bytes, including the length and the Control ID.

Weather Volume Data Package

The Weather Volume Package is composed to the following Blocks

| Block | Notes |
|---|---|
| Type/Severity | See Table 2 |
| Expiration | See Table 3A |
| Altitude | See Table 4 |
| Wind Vector | See Table 5 |
| Area | See Table 6 |

Surface Conditions Data Package

The Surface Conditions Package is composed to the following Blocks

| Block | Notes |
|---|---|
| Conditions | See Table 1 |
| Expiration | See Table 3b |
| Wind Vector | See Table 5 |
| Area | See Table 6 |

TABLE 1

Conditions Block

| BYTE | LINEAR BITS | DEFINITION | NOTES |
|---|---|---|---|
| 1 | 8:1 | Temperature | Degrees C. (−64 to 63.5 LSB = 0.5) |

TABLE 1-continued

Conditions Block

| BYTE | LINEAR BITS | DEFINITION | NOTES |
|---|---|---|---|
| 2 | 16:9 | Dew Point | Degrees C. (−64 to 63.5 LSB = 0.5) |
| 3, 4 | 26:17 | Pressure | in Hg (signed number offset from 29.92, LSB = 0.01) |
| 4 | 32:27 | Visibility | Nm (0.25 to 16+) |
| 5 | 36:33 | Sky Cover | ⅛ths |
| 5 | 40:37 | Spares | |

General Data Block Definitions

TABLE 2

Type/Severity Block

| BYTE | LINEAR BITS | DEFINITION | NOTES |
|---|---|---|---|
| 1 | 5:1 | Type | See Table 7 |
| 1 | 8:6 | Severity | 0 to 7 (aircraft dependent interpretation) |

TABLE 7

Weather Volume Types

| Type | Description | Symbol Depiction |
|---|---|---|
| 0 | Convective Activity | '/' |
| 1 | Turbulence | '^' |
| 2 | Icing | 'v' |
| 3 | Lightning | '!' |
| 4 | Windshear | 'X's |
| 5 | Volcanic Ash | |
| 6 | Rain | ',' |
| 7 | Snow | '*' |
| 8 | Hail | |
| 9 | Winds | |
| 10–31 | Spare | |

Weather Volume Severity

| Severity | Description |
|---|---|
| 0 | Negligible for light aircraft |
| ... | ... |
| 7 | Extreme for Heavy aircraft |

The numeric Severity is interpreted by the EGPWS for the specific aircraft and reduced to one of the following Severity levels.

| Aircraft Severity level | Symbol Depiction |
|---|---|
| Negligible | Not depicted |
| Light | Green |
| Moderate | Yellow |
| Severe | Red |
| Extreme | Bold Red/Magenta |

Effectivity

Effectivity simply refers to the time (GMT) at which the current data were taken and the time after which it should no longer be used.

TABLE 3A

| BYTE | LINEAR BITS | DEFINITION | NOTES |
|---|---|---|---|
| 1 | 8:1 | Initial Time | LSB = 0.1 hrs |
| 2 | 16:9 | Expiration Time | LSB = 0.1 hrs |

Since there is an inherent potential confusion as to whether a time is an hour ago or 23 hours from now, these times are interpreted as being somewhere within the sliding window that begins four hours prior to and twenty hours ahead of the current time.

TABLE 3B

Expiration Block

| BYTE | LINEAR BITS | DEFINITION | NOTES |
|---|---|---|---|
| 1 | 8:1 | Expiration | Relative to receipt (0.1 hrs) |

TABLE 4

Altitude Block

| BYTE | LINEAR BITS | DEFINITION | NOTES |
|---|---|---|---|
| 1 | 8:1 | Top of Volume | 250 ft LSB Range: −4,000 ft to 60,000 ft |
| 2 | 16:9 | Bottom of Volume | 250 ft LSB Range: −4,000 ft to 60,000 ft |

TABLE 5

Wind Vector Block

| BYTE | LINEAR BITS | DEFINITION | NOTES |
|---|---|---|---|
| 1 | 8:1 | Wind Direction | LSB = 360/256 (1.4 degrees) |
| 2 | 16:9 | Wind Speed | LSB = 2 Knots (0 to 510 knots) |

TABLE 6

Area Block

| BYTE | LINEAR BITS | DEFINITION | NOTES |
|---|---|---|---|
| 1 | 8:1 | Type | See Table 8 |
| 2 | 8:1 | Area Sub-Type data | See sub-paragraph |
| ... | | | |
| N | | | |

TABLE 8

| Area Type | Description |
|---|---|
| 0 | Circle |
| 1 | Rhombus |
| 2 | Triangle |
| 3 ... 127 | Polygon of 2 ... 127 points |
| 128 ... 255 | Spare |

TABLE 9

| BYTE | LINEAR BITS | DEFINITION | NOTES |
|---|---|---|---|
| 1, 2 | 16:1 | Latitude | See below |
| 3, 4 | 32:17 | Longitude | |

Latitude and Longitude are scaled with LSB=360°/2^16= 0.00549316 degrees. This gives a range of +179.9945 to −180 degrees.

Circle

| BYTE | LINEAR BITS | DEFINITION | NOTES |
|---|---|---|---|
| 1–4 | 32:1 | Vertex | See Table 9 |
| 5 | 40:33 | Radius | LSB = 0.5 nm Range: 0 to 127.5 nm |

Rhombus

Figure 4:
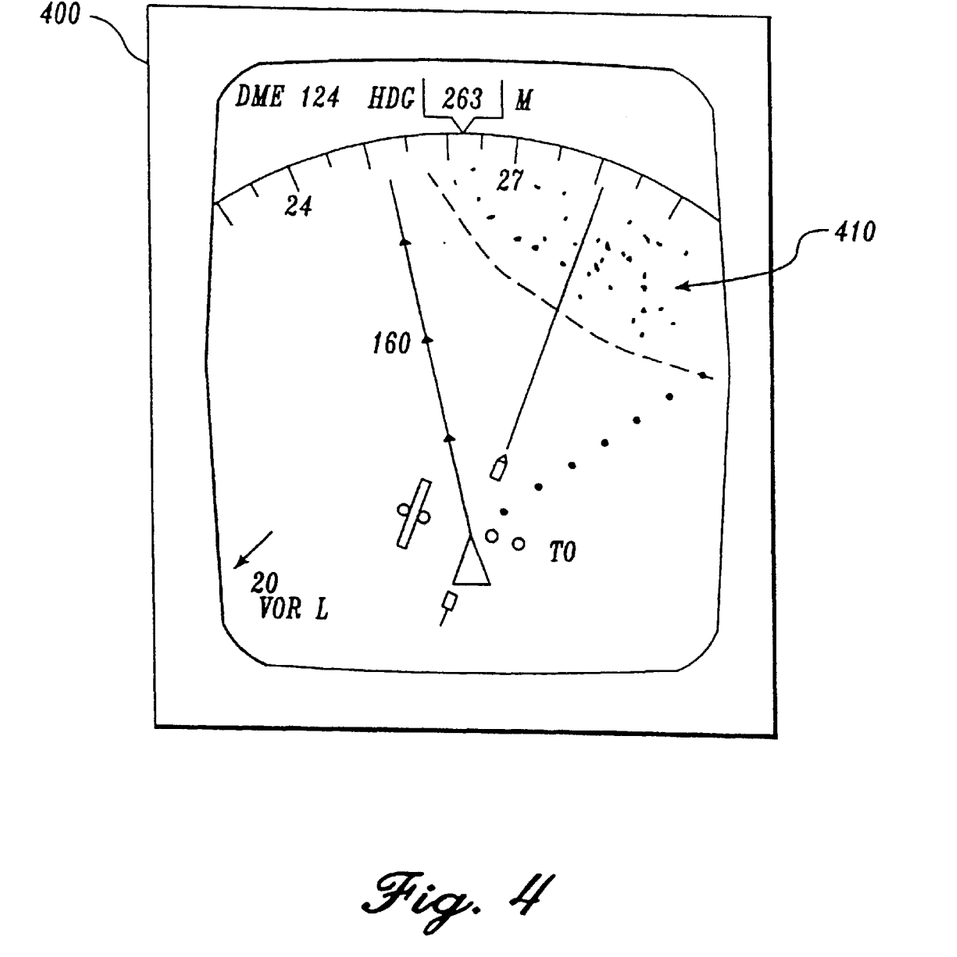
Figure 4A:
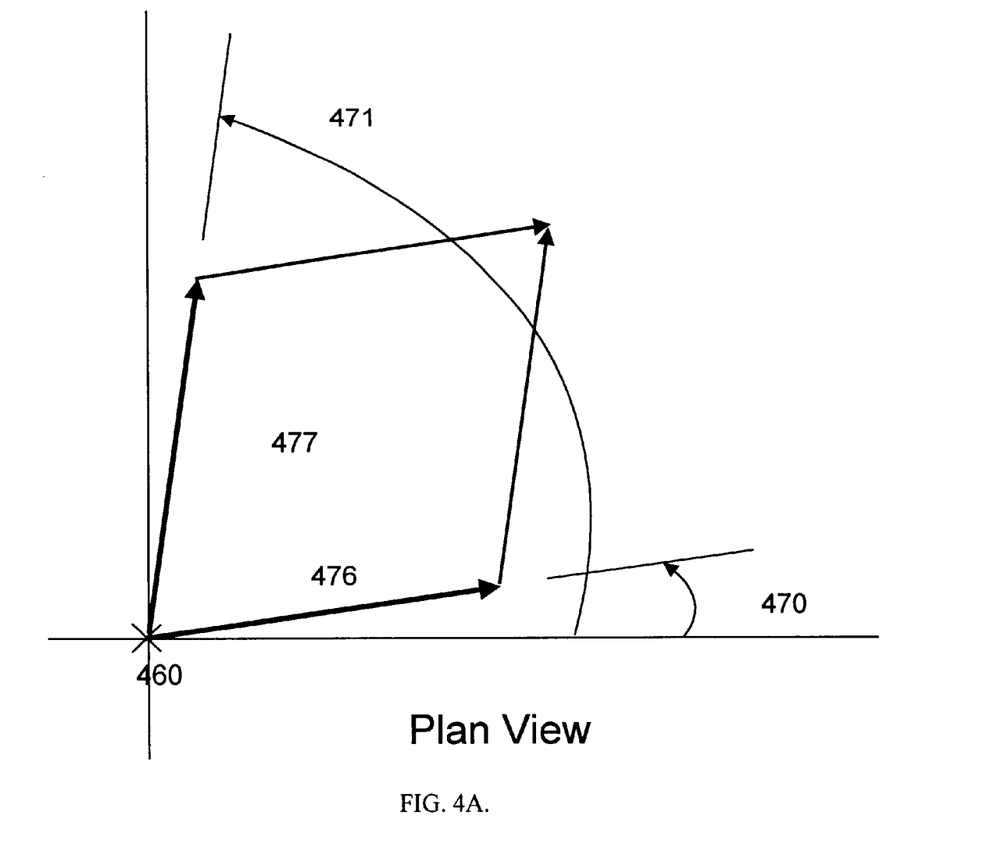

The rectangular format describes a regular rhomboid in local linear coordinates, as illustrated in FIG. 4A. The description starts with a corner point 460 (a latitude and longitude), two angular directions 470, 471 (in degrees from true north), and two vector lengths 476, 477 (in nautical miles).

| BYTE | LINEAR BITS | DEFINITION | NOTES |
|---|---|---|---|
| 1–4 | 32:1 | Vertex | See 09 |
| 5 | 40:33 | First Direction | See description below |
| 6 | 48:41 | First Distance | See description below |
| 7 | 56:49 | Second Direction | |
| 8 | 64:57 | Second Direction | |

| Element | Range | Scale factor (LSB) |
|---|---|---|
| Direction | 0 to 179.3 degrees | LSB = 180°/2^8 = 0.703125 degrees. Corner point is chosen as southern-most point so that only 1st and 2nd quadrant angles need to be sent. Increases resolution. |
| Distance | 0 to 127.5 nm | LSB = 0.5 nm. If the polygon needs to be more than 127.5 nm on a side, multiple polygons will have to be sent. |

Triangle

Figure 5:
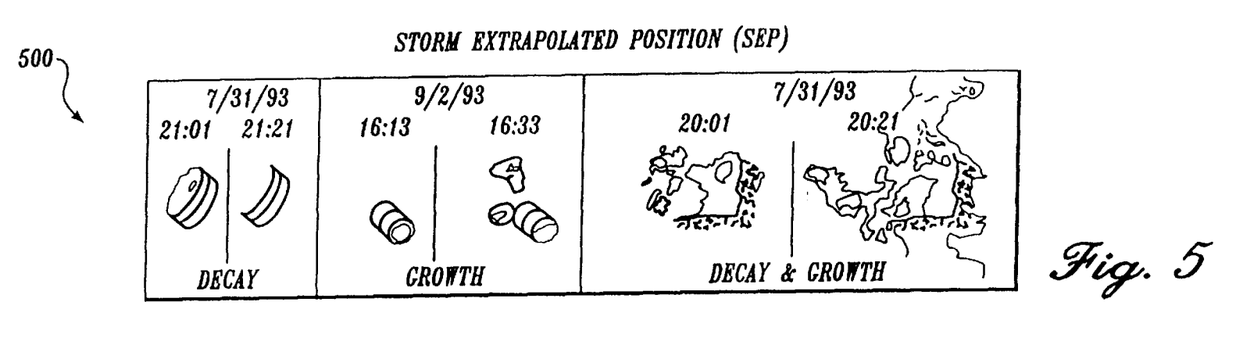
FIG. 5 illustrates a current weather product.
Figure 5A:
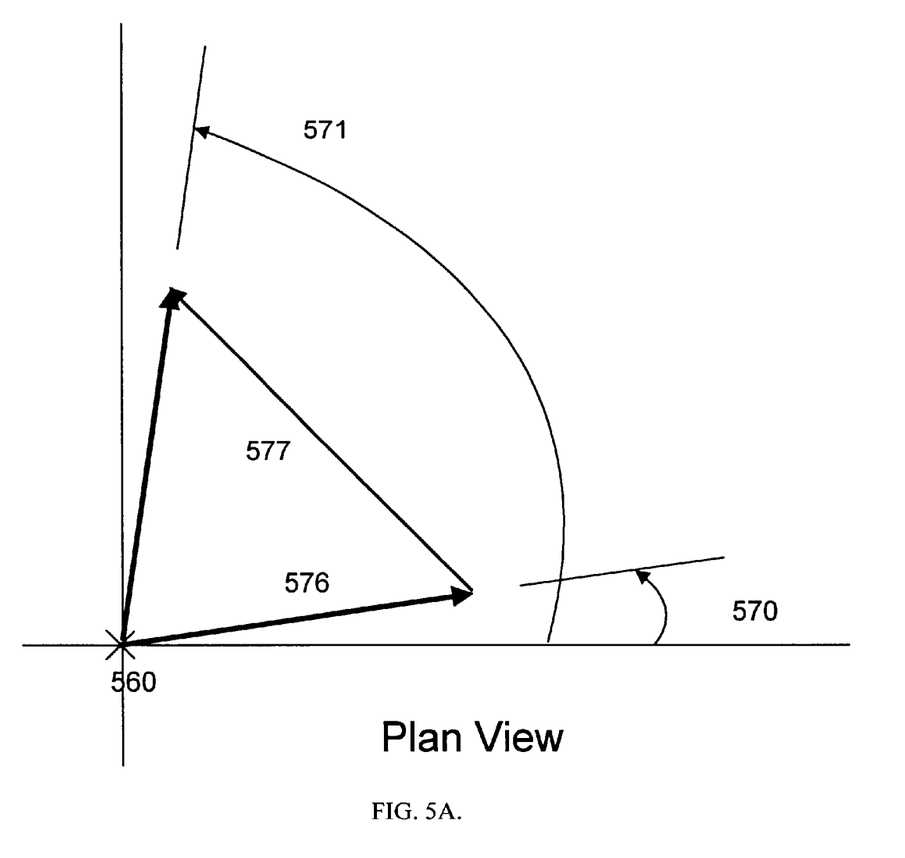

The triangle format describes a triangle in local linear coordinates, as illustrated in FIG. 5A. The description starts with a corner point 560 (a latitude and longitude), two angular directions 570, 571 (in degrees from true north), and two vector lengths 576, 577 (in nautical miles).

| BYTE | LINEAR BITS | DEFINITION | NOTES |
|---|---|---|---|
| 1–4 | 32:1 | Vertex | See 0 |
| 5 | 40:33 | First Direction | See description below |
| 6 | 48:41 | First Distance | See description below |
| 7 | 56:49 | Second Direction | |
| 8 | 64:57 | Second Direction | |

| Element | Range | Scale factor (LSB) |
|---|---|---|
| Direction | 0 to 179.3 degrees | LSB = 180°/2^8 = 0.703125 degrees. Corner point is chosen as southern-most point so that only 1st and 2nd quadrant angles need to be sent. Increases resolution. |
| Distance | 0 to 127.5 nm | LSB = 0.5 nm. If the polygon needs to be more than 127.5 nm on a side, multiple polygons will have to be sent. |

General Polygon

| BYTE | LINEAR BITS | DEFINITION | NOTES |
|---|---|---|---|
| 1–4 | 32:1 | Vertex 1 | See 09 |
| ... | | | |
| (4N-3)-4N | | Vertex N | |

Data Flow

In one embodiment of the invention, data is sent to the aircraft display over a ARINC 429 bus, and responses will be on a separate ARINC 429 bus.

The invention is applicable to a broad spectrum of aircraft. The embodiment could be done through a sequence of computer program instructions or electronic microcircuitry. The use of a general-purpose computer processor would be the preferred method, due to the need to minimize weight and power consumption. Other data packaging, and display symbology may be used. The methods and display types shown above are for illustrative purposes only.

Description of the Specific Embodiments

In a preferred embodiment of the invention, a first aircraft collects local atmospheric data, in situ accelerations and other flight data as a function of aircraft position and altitude which is down-linked to a ground station. The down-linked information is used to assemble weather products based on, for example, National Center of Atmospheric Research models and displayed in the ground station. In a preferred embodiment of the present invention, the information is also linked to sister aircraft to increase the level of detail available for refining the weather products. According to one aspect of the invention, the invention provides multiple weather products, for example, turbulence, position, altitude, winds, temperature, severe cells from weather radar returns and other products. The ground station up-links the weather products, for example, position, speed and track, and magnitude of significant weather to the originating aircraft and other aircraft. The weather products are received, displayed and stored until the next up-link is received.

The weather products up-linked, displayed and stored by the invention include, but are not limited to, significant weather. At the pilot's discretion and for tactical use, weather areas and in particular significant hazardous weather areas are displayed on a cockpit display. The cockpit display is, for example, an existing cockpit EFIS map and/or color weather radar display found in airline service. According to one embodiment of the invention, the pilot may manually select between display of the weather products information and the display of other information such as, for example, terrain, weather radar or EFIS map.

Figure 1:
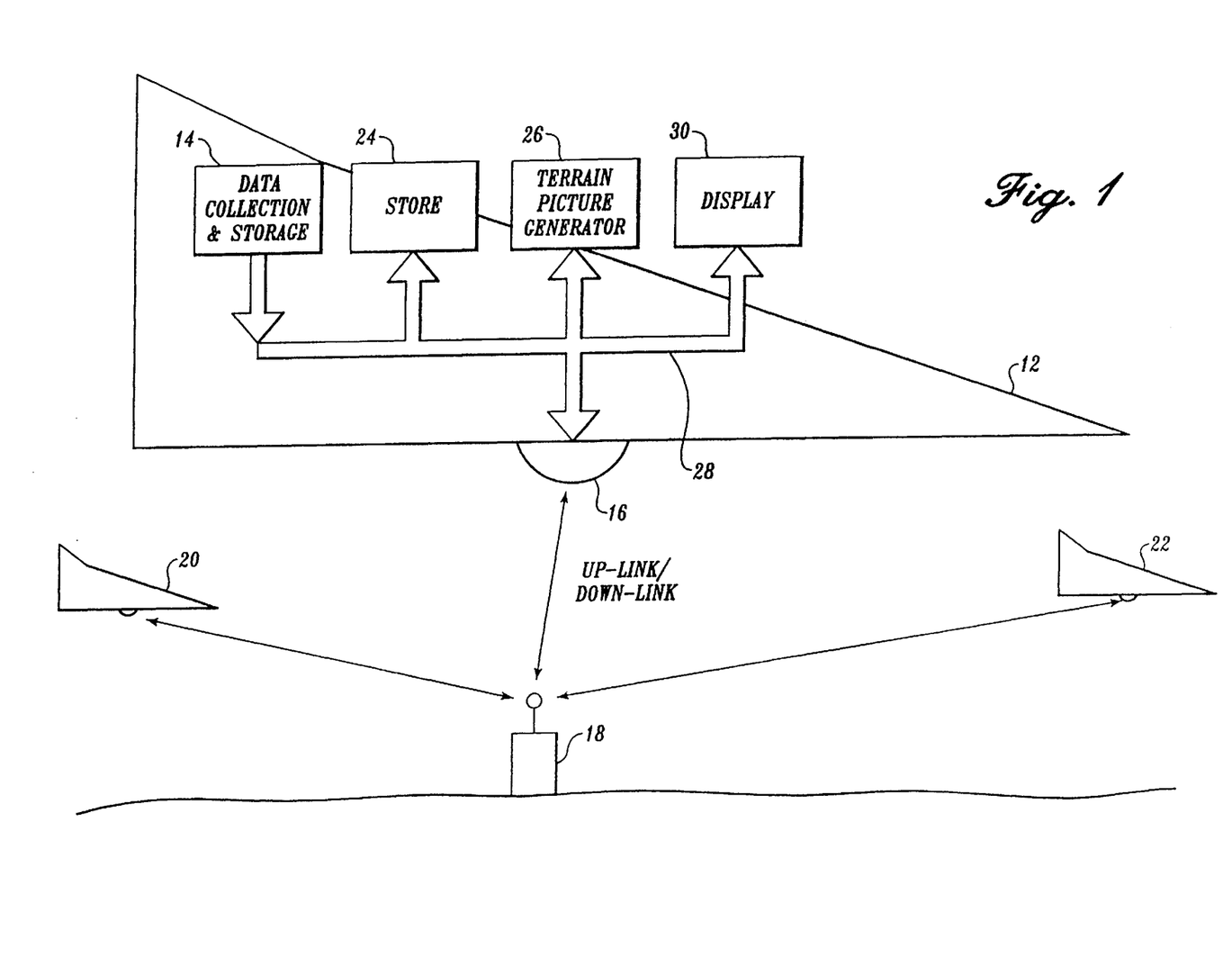
FIGS. 1–1B illustrate a practical application according to one embodiment of the present invention.

FIG. 1 diagrams the data collection, up-link/down-link, weather product storage and display aspects of the invention. In a preferred embodiment, the invention predominantly uses existing equipment. For example, in aircraft weather information system 10 shown in FIG. 1, an aircraft 12 collects current local atmospheric data, in situ accelerations and other flight data as a function of aircraft position and altitude using existing on-board data sources, for example, on-board navigation data, altitude data, atmospheric data and weather radar return data. The invention stores the data in a memory storage location 14. The data is down-linked via an antenna 16 to a ground station 18 where the data is used to assemble and refine weather products. The weather products are up-linked to originating aircraft 12 and other aircraft 20, 22. The weather products are received and stored in a memory location 24 and converted to visual depictions using a picture generator 26, for example, an existing ground proximity terrain picture and symbol generator. The video data is transmitted via the existing weather video bus interface 28 and displayed on one or more existing cockpit color display devices 30, for example, an EFIS map and/or a weather radar display. Thus, the invention operates independently of the aircraft system level data bus and symbol generators.

Figure 1A:
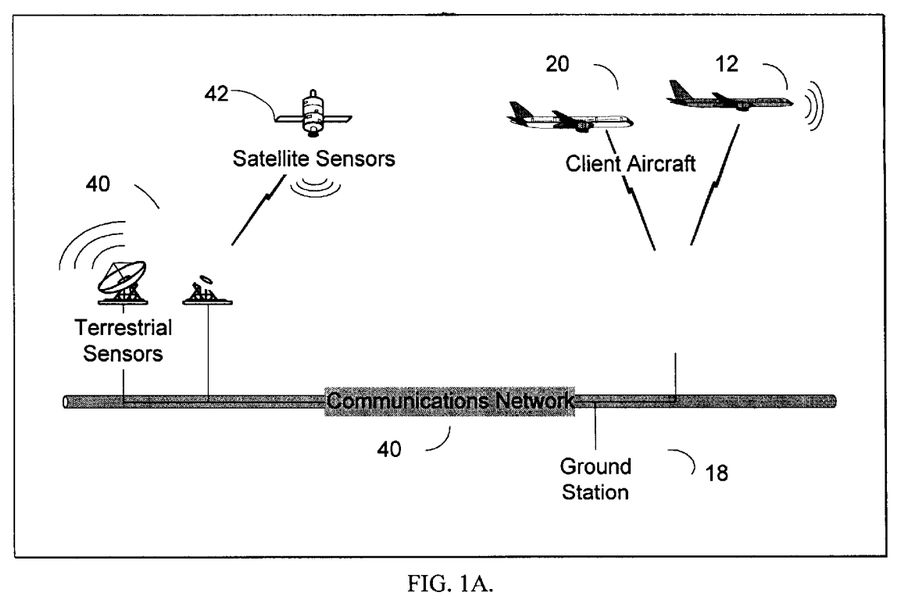
Figure 1B:
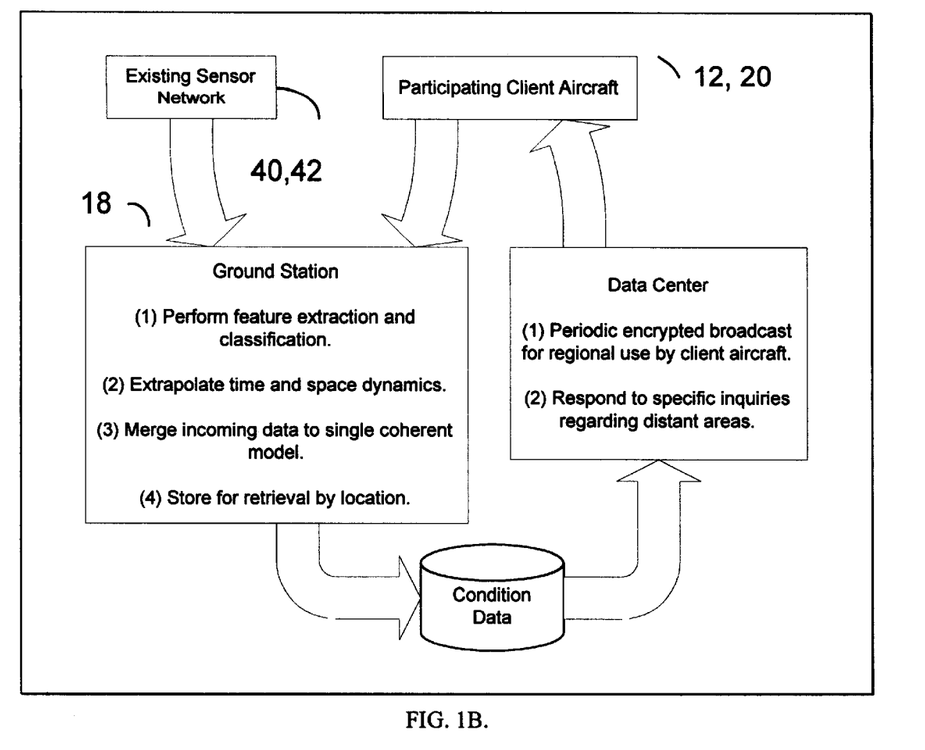

FIG. 1a illustrates one embodiment of the network of additional existing equipment used by the present invention to transmit data between geolocations. In addition to data transmission between originating aircraft 12 and other aircraft 20, a communications network 40 links the ground station 18 to other terrestrial sensors 40 and satellite-based sensors 42. FIG. 1B illustrates one embodiment of the invention showing functions performed by the ground station 18.

In a preferred embodiment of the invention, unique polygon-shaped icon images depicting and bounding significant hazardous weather are shown on existing color displays found in the cockpit. Each unique polygon image uniquely depicts a specific significant weather hazard area, for example, convective hazard areas, potential turbulence areas, winter precipitation areas or icing areas. According to one embodiment of the invention, significant weather is displayed to a minimum range of 320 nautical miles along the aircraft's flight path. According to another embodiment of the invention, significant weather is displayed to a minimum range of 640 nautical miles along the aircraft's flight path.

Figures 2A, 2B, 2C, 2D, 2E:
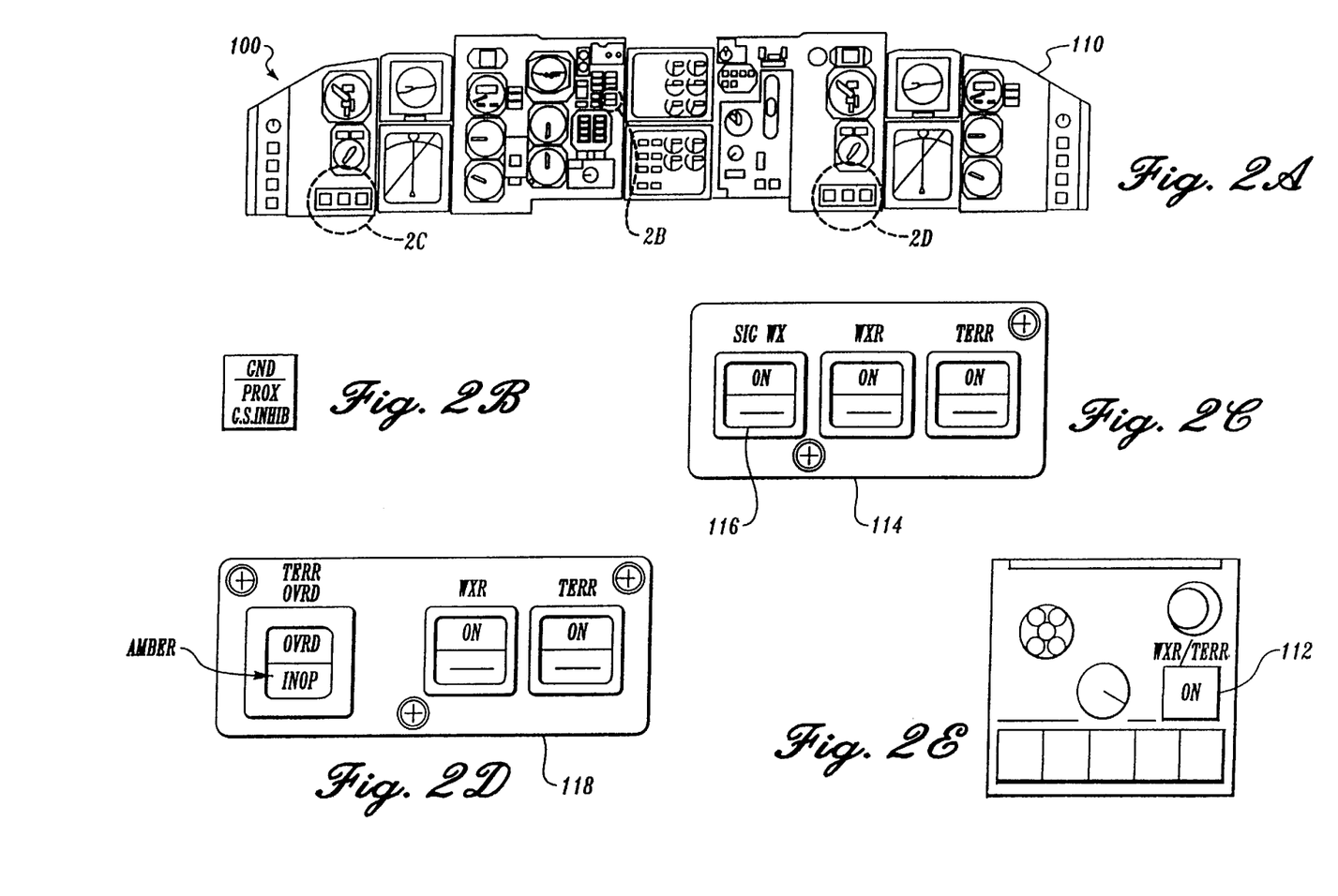
FIG. 2 illustrates a typical cockpit installation according to one embodiment of the present invention.

FIG. 2 illustrates a typical cockpit installation 100 of the present invention. The particular cockpit installation depicted in FIG. 2 is a retrofit installation wherein an aircraft instrument panel 110 includes a ground proximity warning system accessed by weather radar/terrain switch 112. The pilot's ground proximity warning system switch panel 114 is modified to incorporate a on/off switch 116 whereby the pilot accesses the significant weather data upon command. Instrument panel 110 includes ground proximity warning system switch panel 118.

Weather radar video data bus 28 is, for example, a video data bus compliant with Aeronautical Radio, Incorporated (ARINC) standard 453, which incorporates a limited palette of colors and has limited band width capabilities. Fabrication of the unique polygon-shaped icons which depict and bound significant hazardous weather areas is bounded by these video data bus limitations. Implementation of the invention using other video data buses is possible, however, and the invention itself is not so limited.

The icons displayed are a variety of polygons unique to a specific significant weather hazard, for example, convective hazard areas, potential turbulence areas, winter precipitation areas or icing areas. According to one embodiment of the invention, the icons are two-dimensional (2D) images indicating the weather hazard's geographic location relative to the aircraft. According to another embodiment of the invention, the icons are three-dimensional (3D) images indicating the weather hazard's altitude relation to the aircraft in addition to the weather hazard's relative geographic location.

Figure 3:
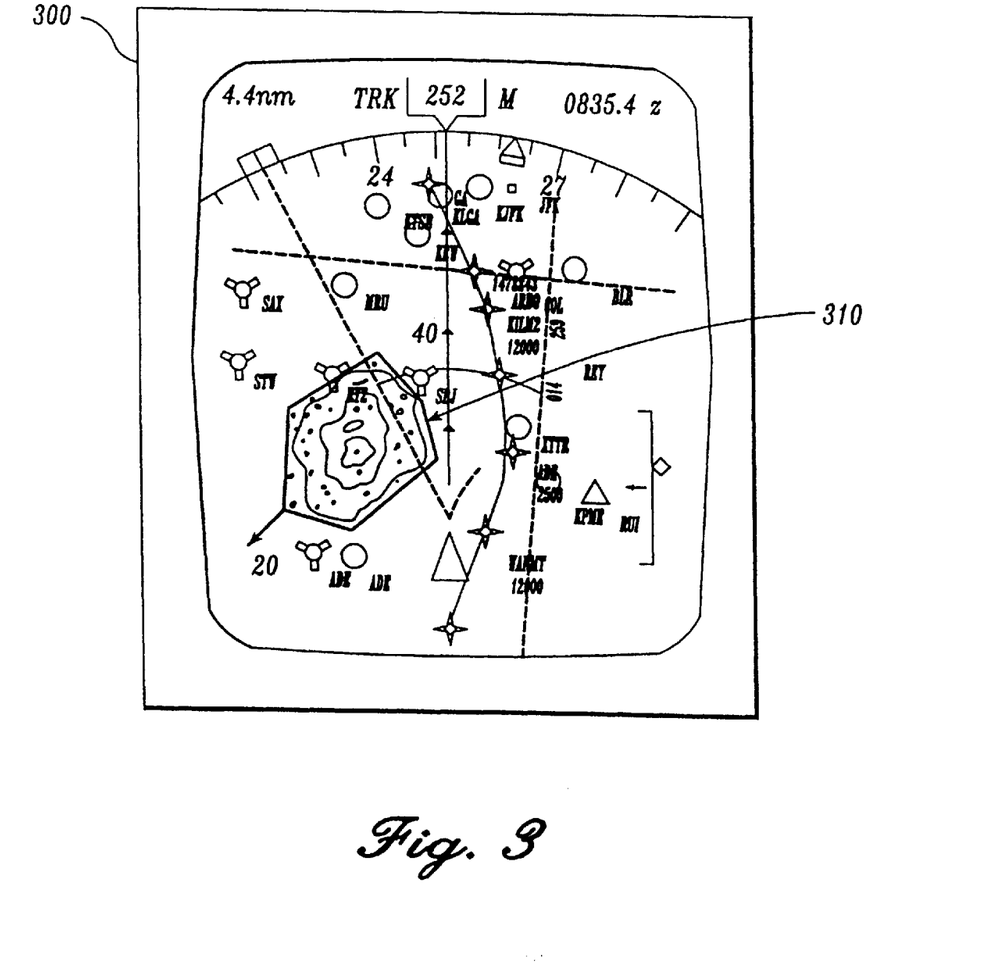
FIGS. 3 and 4 show examples of weather polygons according to one embodiment of the present invention.

FIGS. 3 and 4 show examples of weather polygons according to the invention. FIG. 3 illustrates a cockpit display 300 selected to display data within an eighty nautical mile range of the aircraft. FIG. 3 includes an example of a unique 2D polygon-shaped image 310 depicting a predicted hazardous convectivity activity area. According to the invention, polygon-shaped image 310 is displayed in color, for example, polygon-shaped image 310 is displayed as a red polygon shape with red color dots. According to one preferred embodiment, the weather radar returns of cells lying within the hazardous convectivity activity area are displayed inside polygon-shaped image 310.

Figure 3A:
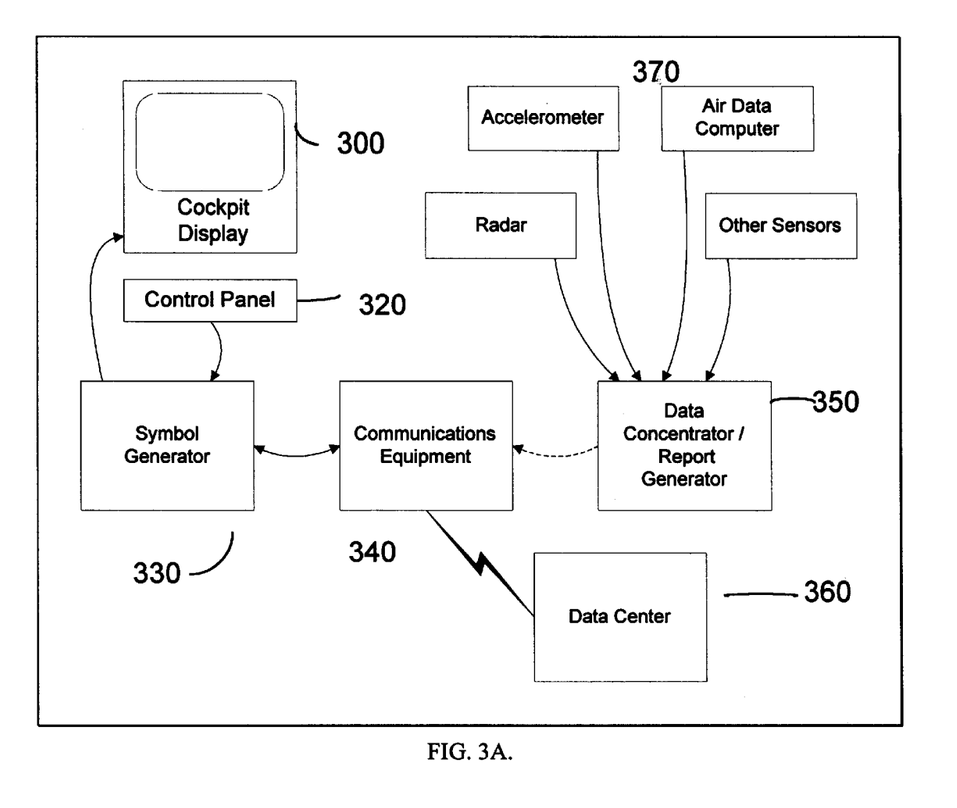

FIG. 3A illustrates one embodiment of the invention as located on the aircraft. Cockpit display 300 is controlled by control panel 320 and fed data by symbol generator 330. Symbol generator 330 is in turn driven by control panel 320 and communications equipment 340. A Data concentrator/report generator 350 gathers weather data from on-board sensors 370, and sends the processed data to the communications equipment 340 for on-board display and down-link to a data center 360.

FIG. 4 illustrates another cockpit display 400 according to one embodiment of the invention selected to display data within a three hundred twenty nautical mile range. FIG. 4 includes an example of a unique 2D polygon-shaped image 410 depicting a predicted turbulence area. According to the invention, polygon-shaped image 410 is displayed in color, for example, polygon-shaped image 410 is displayed as a yellow polygon shape with yellow color dots.

Weather threat conditions are communicated to the pilot by displaying patterned polygons on the weather radar/terrain awareness display. Thus the pilot sees a series of two-dimensional figures in a plan view. In a modem glass cockpit this display is overlaid by NAV symbology on the EFIS. The threat display is scaled and rotated just as the weather radar and terrain awareness are, so the pilot can easily see the relationship of his short-term path to the meteorological threats around him.

These figures are drawn to look distinctly different than the features normally shown on the on-board weather radar. It is important from a human-factors standpoint that the crew be able to distinguish local sensed data from computer-merged data, because the reliability and accuracy of the two data sets differ.

One embodiment of the animated figures is in the use of translucency. In order to place the uplinked weather information on the same display with background terrain or radar returns, the weather images are configured as pattern-filled polygons. The fill pattern has large regions of transparency, so that the terrain shows through. Thus, an aircrew can view a weather broadcast and terrain or radar return on the NAV display at the same time. The ability to visually integrate the weather and terrain information is an important element to reducing crew workload and enhancing safety.

The patterning algorithm used to display weather information includes rules to insure that the full boundary is always drawn, regardless of range/scale, and to make sure that pattern density is always in the range of 1:4 to 1:8. Higher density has been found to clutter the display and obscure the terrain, while lower densities have been found to not convey the full severity of the threat in a single glance. The exact pattern (shape & density) is configurable according to customer & local regulatory preference.

Figure 6:
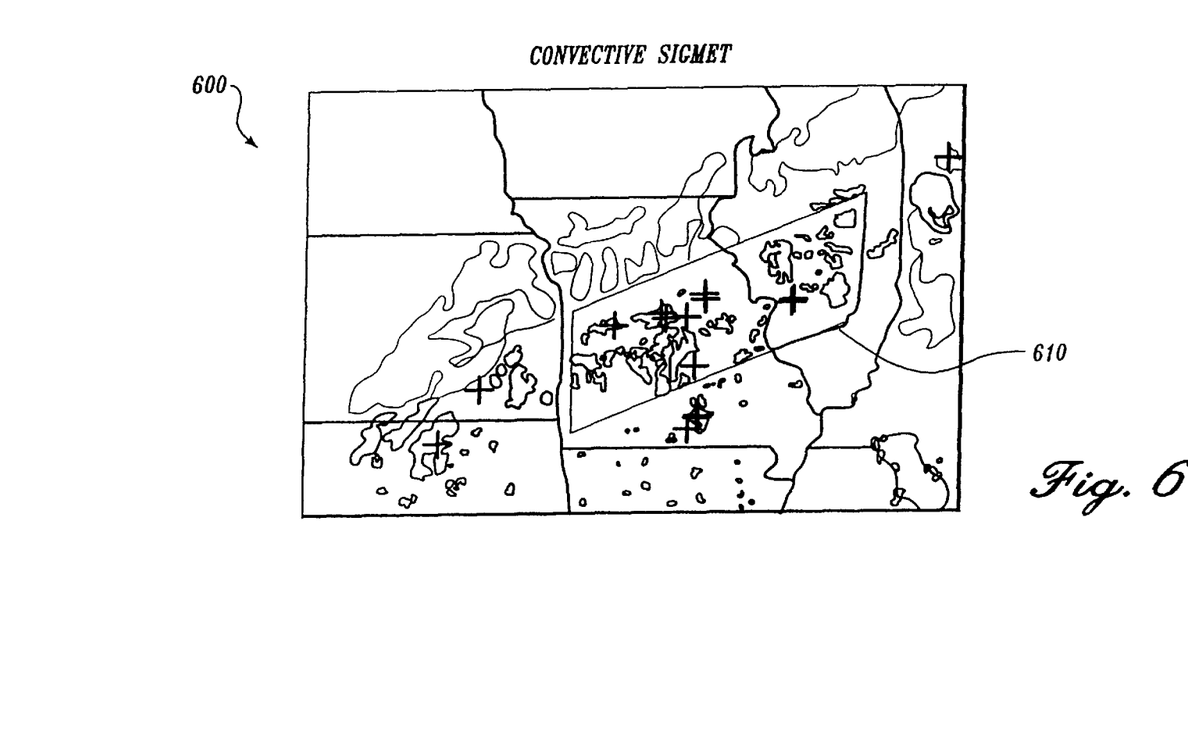
FIG. 6 illustrates another current weather product, including an example of a weather polygon according to one embodiment of the present invention.

FIGS. 5 and 6 illustrate two current weather products which are incorporated into the invention. FIG. 5 illustrates a storm extrapolated position (SEP) 500 indicating the growth and decay of a weather area. FIG. 6 illustrates a convective SIGMET 600 which is a weather advisory concerning weather significant to the safety of all aircraft. For example, convective SIGMETs are issued for tornadoes, lines of thunderstorms, embedded thunderstorms of any intensity level, areas of certain thunderstorms and hail ¾ inch or greater. FIG. 6 includes another example of a unique 2D polygon-shaped image 610 depicting a convective SIGMET. According to the invention, polygon-shaped image 610 is displayed in color, for example, polygon-shaped image 610 is displayed as a red polygon shape with red color dots.

One embodiment of the invention comprises a display with resolution, update speed, color depth, and/or alpha blending (transparency) sufficient to graphically depict the dynamics of a storm for the crew. Exemplary methods for showing this information include:

Using different fill patterns to indicate storm state over time.

Using animation to show storm state over time.

Using different colors indicate to past/future storm state values.

Using transparency to indicate where the storm has been and/or where it is headed.

The use of fill patterns, colors, or transparancy are preferred embodiments to show changes in a storm's position and optionally size. Animation is a preferred method of showing a change in weather intensity, especially on a slow- or non-moving cell. As applied to rudimentary display systems, one alternate embodiment of the invention is a frame-by-frame animation, wherein the crew changes to the next or previous frame by interactive methods, and waits for the picture to draw as necessary.

The dynamic display allows the crew to make more effective go/no-go decisions and course corrections that take into account not only the current state of the storm, but also what the state will likely be in the future.

A preferred embodiment of the invention additionally comprises a computer that has access to the weather reference model for the area along the flight path, the aircraft state data (position, speed), and the aircraft flight plan data. The data set is merged into existing storm models and algorithms described herein to predict whether the aircraft will encounter any storms or other adverse conditions if it continues on the current path. This is done by checking in small steps along the predicted path to see whether the aircraft's "envelope" intersects the space that will be occupied by a phenomena in the reference model when the aircraft gets to that position. The "envelope" is a volume of space, perhaps a few miles in horizontal extent and vertically a couple thousand feet above and below the aircraft's altitude. Depending on the type of phenomena, the vertical extent for alerting purposes might be significantly larger than the storm itself, to account for uncertainties in measurements, drift over time, and invisible side-effects. For example, the vertical extent of a convective storm cell might be modelled as going from ground level up to 30,000 feet, even if the tops of the clouds only extend to 18,000 feet, due to knowledge that convective cells create invisible disturbances at an appreciable distance in all directions. In contrast, a clear-air-turbulence phenomena may have a vertical extent of only a couple thousand feet if it is created by shear layers. This bounding would be added to the reference model if aircraft flew over or under the reported disturbance without encountering any turbulence.

The trigger level for alerting can and should be made variable, by aircraft type, by airline policy, and/or by crew preference. The trigger-level computer might exist in a central data enter, or it might be on-board. Once an encounter with adverse conditions is predicted, the crew is alerted via aural message, an alert lamp, text message, graphics, or other means. The crew would then consult the graphic display for more information. They can optionally call up additional background information (perhaps text readout of intensity levels, or a the raw image from which the cartoon was developed). The crew would then decide whether or not to make a change to the aircraft altitude, direction, speed, destination, or other variables under their control.

Embodiments of the invention include at least the following interactive features:

Request for a picture of weather outside the local area.

Request for a picture of the native (raw) data.

Request for a depiction of trends, particularly animated depictions.

Request for details (textual or otherwise) behind a storm icon.

Request for a particular warning level or sensitivity setting.

Weather data requests for a particular distant area, such as the destination airport area, is a feature that improves enroute planning for diversions and emergencies. Raw data viewing gives flight crews tools for both building confidence in the invention and for auditing its performance. However, as previously discussed, sending raw data at all times is unneeded and consumes a large amount of bandwidth.

In present art devices, the display of trend data tends to clutter the display. Therefore the present invention utilizes interactivity to make this information available only when requested.

Requests for details behind the storm icons will raise flight crew confidence level that the computer is making the same decisions about severity that the crew would have made in its place. This feature can optionally provide details that are not currently viewable to the crew, which can assist in the refinement of algorithms.

The invention's ability to control warning levels, alerting volumes, prediction times, and other variables increases system utility, minimizes false alarms, and enhances crew acceptance.

Another embodiment of the invention comprises the addition of features that allow the retention of crew interactive settings, with automatic retrieval at set times or events. Such adaptation would occur, for example, based on crew self-identification (personalized settings), phase of flight, altitude, deviation from flight plan, local traffic density, proximity to terrain, emergency events such as engine or pressurization failure, changes in squawk code, or other factors that indicate a change in crew workload and an increase or decrease in the relative importance of weather information.

Another embodiment of the invention includes elements that monitor for communications failures, and subsequently alert the crew to loss of the invention's predictive/alerting abilities as soon as a failure is detected. At the same time, commonly-occurring short-duration loss of communications should not cause the crew to be distracted unnecessarily. The invention alerts the crew only if the outage is of sufficient duration and a potential weather threat exists.

What is claimed is:

1. An aircraft-based weather information sharing and display device comprising:

at a ground station:
reception equipment for receiving weather parameters from a plurality of weather-sensing sources;
processing equipment for generating a refined weather information report, based on said received weather parameters, using data compression techniques to reduce the size of said weather information report; and
transmission equipment for uplinking said refined data-compressed weather information report to a plurality of aircraft; and at an aircraft:
standard weather information gathering equipment for detecting local weather parameters characterizing a weather condition in the vicinity of the aircraft;
transmission equipment for transmitting said local weather parameters to said ground station;
reception equipment for receiving said refined data-compressed weather information report uplinked by said ground station;
storage equipment for storing received said weather information report and said detected local weather parameters;
picture generating equipment for generating symbolic pictorial information based on the received refined weather information and said detected local weather parameters; and
weather information display equipment, coupled to the picture generating equipment, for displaying pictorial polygons indicating the dynamic behavior of said weather condition and a future prediction of the behavior of said weather condition,
wherein said displayed pictorial polygons of said dynamic behavior and said future prediction presents an intensity indication of said weather conditions, the intensity indication is unrelated to direction of travel.

2. The device of claim 1 wherein said pictorial polygons display the predicted dynamic behavior of said weather conditions.

3. The device of claim 1 wherein said dynamic behavior comprises the movement of said weather conditions.

4. The device of claim 1, wherein said data compression technique further comprises a weather parameter rate such that the frequency of said uplinking of said weather information report is reduced.

5. The device of claim 1, wherein the ground station further comprises a broadcast scheduling equipment that tailors said weather information report to each of said plurality of aircraft, based on a position of each of said aircraft, such that the length of said weather information report is reduced.

6. The device of claim 1, wherein said data compression technique comprises extracting salient features of said refined weather information, and inputting said salient features into said weather information report.

7. The device of claim 1, wherein said data compression technique comprises formatting said weather information report in an Aviation Weather Information Network format.

8. The device of claim 1, further comprising equipment on said aircraft that generates an alert to the aircraft pilot when said processing equipment detects a dangerous weather phenomenon.

9. The device of claim 1 wherein the future prediction includes a prediction of one or more of strength, position, speed, direction of travel, size, rate of rain, or turbulence level.

10. A method for displaying the dynamic behavior of a weather condition on an aircraft display comprising the steps of:

receiving a refined data-compressed weather information report uplinked by a weather ground station;
decompressing said refined data-compressed weather information report;
storing said received refined decompressed weather information report;
generating symbolic pictorial information based on said received weather information report utilizing standard picture generating equipment already installed on the aircraft; and
displaying pictorial polygons indicating the dynamic behavior of said weather condition and a future prediction of the behavior of said weather condition using EFIS or weather radar display equipment already installed on the aircraft,
wherein said displayed pictorial polygons of said dynamic behavior and said future prediction presents an intensity indication of said weather conditions, the intensity indication is unrelated to direction of travel.

11. The method of claim 10 wherein said step of displaying comprises:
displaying the area surrounding the aircraft's flight path; and
displaying polygons representing the predicted dynamic behavior of significant weather formations, based on said uplinked weather information, relative to said flight path such that a pilot may navigate away from dangerous weather.

12. The method of claim 10 wherein said step of displaying comprises overlaying said pictorial symbols over a locally-received weather radar return display.

13. The method of claim 10 wherein the future prediction includes a prediction of one or more of strength, position, speed, direction of travel, size, rate of rain, or turbulence level.

* * * * *